US012700784B2

(12) United States Patent
Gischler et al.

(10) Patent No.: US 12,700,784 B2
(45) Date of Patent: Aug. 4, 2026

(54) COMPACT OFFSET OUTRUNNER HARMONIC DRIVE ROTARY ACTUATOR AND DEPLOYMENT SYSTEM USING SAME

(71) Applicant: Joby Aero, Inc., Santa Cruz, CA (US)

(72) Inventors: Jordin Gischler, Santa Cruz, CA (US); Baixi Pei, Newark, CA (US); Rob Thodal, Santa Cruz, CA (US); JoeBen Bevirt, Santa Cruz, CA (US)

(73) Assignee: Joby Aero, Inc., Santa Cruz, CA (US)

( * ) Notice: Subject to any disclaimer, the term of this patent is extended or adjusted under 35 U.S.C. 154(b) by 260 days.

(21) Appl. No.: 18/424,698

(22) Filed: Jan. 26, 2024

(65) Prior Publication Data

US 2024/0171039 A1     May 23, 2024

Related U.S. Application Data

(63) Continuation of application No. 17/400,605, filed on Aug. 12, 2021, now Pat. No. 11,942,855.

(Continued)

(51) Int. Cl.
| | |
|---|---|
| *H02K 21/22* | (2006.01) |
| *B64C 27/52* | (2006.01) |
| *B64C 29/00* | (2006.01) |
| *B64D 27/31* | (2024.01) |
| *B64D 27/34* | (2024.01) |
| *F16H 49/00* | (2006.01) |
| *H02K 7/116* | (2006.01) |

(52) U.S. Cl.
CPC ............. *H02K 21/22* (2013.01); *B64C 27/52* (2013.01); *B64D 27/31* (2024.01); *B64D 27/34* (2024.01); *H02K 7/116* (2013.01); *B64C 29/0033* (2013.01); *F16H 49/001* (2013.01)

(58) Field of Classification Search
CPC ......... F16H 2049/001; F16H 2049/003; F16H 2049/006; H02K 1/2786; B64C 29/0033; B64C 11/306; B64C 11/46; B64C 11/48; B64C 11/50; B64C 27/16; B64C 27/28; B64C 2027/8236; B64D 27/31
USPC ......................................................... 310/83
See application file for complete search history.

(56) References Cited

U.S. PATENT DOCUMENTS

| | | | |
|---|---|---|---|
| 2007/0039414 A1* | 2/2007 | Takemura | ............. F16H 49/001 74/640 |
| 2011/0245006 A1* | 10/2011 | Negishi | ................. B25J 9/1025 74/411 |
| 2016/0229525 A1* | 8/2016 | Van De Veire | ........... B64C 3/48 |

FOREIGN PATENT DOCUMENTS

| | | | | |
|---|---|---|---|---|
| WO | WO-2018194112 A1 * | 10/2018 | ............... H02K 5/16 |

OTHER PUBLICATIONS

WO_2018194112_A1_-_Translation.pdf (Year: 2025).*

* cited by examiner

*Primary Examiner* — Christopher M Koehler
*Assistant Examiner* — Ahmed F Seck
(74) *Attorney, Agent, or Firm* — Michael A. Guth

(57) ABSTRACT

A compact harmonic drive system with a motor residing within the flexspline cup. The motor may reside further into the flexspline cup than the wave generator, and the air gap of the motor may be further out radially than the interior of the wave generator bearing. The motor may use an outrunner configuration with an outboard rotor made up of magnets, allowing for a large radial distance to the air gap and resulting in higher torque. The interior stator windings are thermally well coupled to the drive system structure. The harmonic drive may be coupled to a deployment system adapted to support moment loads perpendicular to the rotation axis such that those loads are not supported by the harmonic drive.

4 Claims, 10 Drawing Sheets

Related U.S. Application Data

(60) Provisional application No. 63/064,413, filed on Aug. 12, 2020.

350

371

370

351

COMPACT OFFSET OUTRUNNER HARMONIC DRIVE ROTARY ACTUATOR AND DEPLOYMENT SYSTEM USING SAME

CROSS-REFERENCE TO RELATED APPLICATIONS

This application is a continuation of U.S. patent application Ser. No. 17/400,605 to Gischler et al., filed Aug. 12, 2021, which claims priority to U.S. Provisional Patent Application No. 63/064,413 to Gischler et al., filed Aug. 12, 2020, which are hereby incorporated by reference in their entirety.

BACKGROUND

Field of the Invention

This invention relates to positioning mechanisms, and more specifically to a compact harmonic drive assembly.

Description of Related Art

Aircraft will typically have many control surfaces that are moved as needed in order to affect an attitude change of the aircraft, or to alter the lift characteristics of the wing. In addition, vertical take-off and landing (VTOL) aircraft may components in order to alter thrust directions from powered thrust producing devices. This may be the motion or alteration of ducts, or may be the rotation and articulation of entire rotor assemblies.

Harmonic drive assemblies may be used in systems where angular precision and a lack of backlash are design goals. Harmonic drive gears are widely used in space and aircraft applications, robotics, and precision positioning systems because of their attractive attributes including near-zero backlash, high speed reduction ratio, compact size, and small weight.

A harmonic drive assembly typically includes a wave generator, a flexspline, and a circular spline. The wave generator is an elliptical cam enclosed in a bearing assembly. The flexspline may come in different configurations, but is typically a thin walled, flexible steel cylinder with external teeth machined on the outside. The circular spline is a solid thick walled ring with internal teeth. The flexspline is slightly smaller than the circular spline, and may have fewer teeth. Harmonic drives may be modular gearing units which are mounted onto a motor, with the motor shaft coupled to the wave generator.

In some applications, there may be a desire for a very compact harmonic drive assembly, with drive motor, that provides high torque and also allows for good thermal management. What is called for is a compact motor driven harmonic drive assembly with the motor embedded within the drive assembly, which also can provide high torque output.

SUMMARY

A compact harmonic drive system with a motor residing within the flexspline cup. The motor may reside further into the flexspline cup than the wave generator, and the air gap of the motor may be further out radially than the interior of the wave generator bearing. The motor may use an outrunner configuration with an outboard rotor made up of magnets, allowing for a large radial distance to the air gap and resulting in higher torque. The interior stator windings are thermally well coupled to the drive system structure. The harmonic drive may be coupled to a deployment system adapted to support moment loads perpendicular to the rotation axis such that those loads are not supported by the harmonic drive.

DETAILED DESCRIPTION

In some aspects, an aerial vehicle may use bladed propellers powered by electric motors to provide thrust during take-off. The propeller/motor units may be referred to as rotor assemblies. In some aspects, the motor driven propeller units on the wings may themselves rotate relative to a fixed wing, such that the propellers provide vertical thrust for take-off and landing. The rotation of the rotor assemblies may allow for directional change of thrust by rotating both the propeller and the electric motor, thus not requiring any gimbaling, or other method, of torque drive from the motor to the propeller around or through a rotating joint. In some aspects, an extended nacelle may reside at the tip of a wing, or at the end of a rear V-tail element, and be adapted to rotate such that the VTOL propeller may provide vertical thrust during take-off and landing.

In some aspects, the motor driven rotor assemblies attached to the wing are adapted to place the mass of the motor and rotor significantly forward of the wing. In some aspects, this forward location allows for the rotation of the rotors to a vertical thrust orientation that has the airflow predominantly in front of the leading edge of the wing, reducing air flow impingement by the wing during VTOL operations. In some aspects, this forward location of the mass of the rotors and motors allows for unusual wing configurations, such as swept forward wings, whose otherwise possible drawbacks during higher g-force maneuvers are partially or fully moderated by this mass placement.

Figure 1:
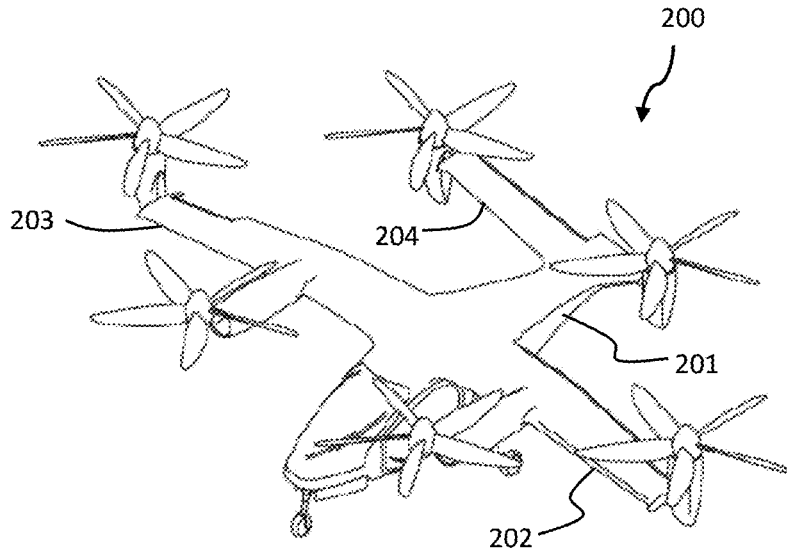
FIG. 1 illustrates an aircraft in a forward flight configuration with compact rotary actuators according to some embodiments of the present invention.

In an exemplary embodiment, as seen in a vertical take-off configuration in FIG. 1, an aerial vehicle 200 uses forward swept fixed wings 202, 203 with rotors of different types adapted for both vertical take-off and landing and for forward flight. The aircraft body 201 supports a left wing 202 and a right wing 203. The wing mounted motor driven rotor assemblies 206 are mounted on the wings include propellers. The wingtip motor driven rotor assemblies 207 are mounted onto the wingtips. The aircraft body 201 extends rearward is also attached to raised rear stabilizers 204. The rear stabilizers have rear rotor assemblies 205, 208 attached thereto.

Figure 2:
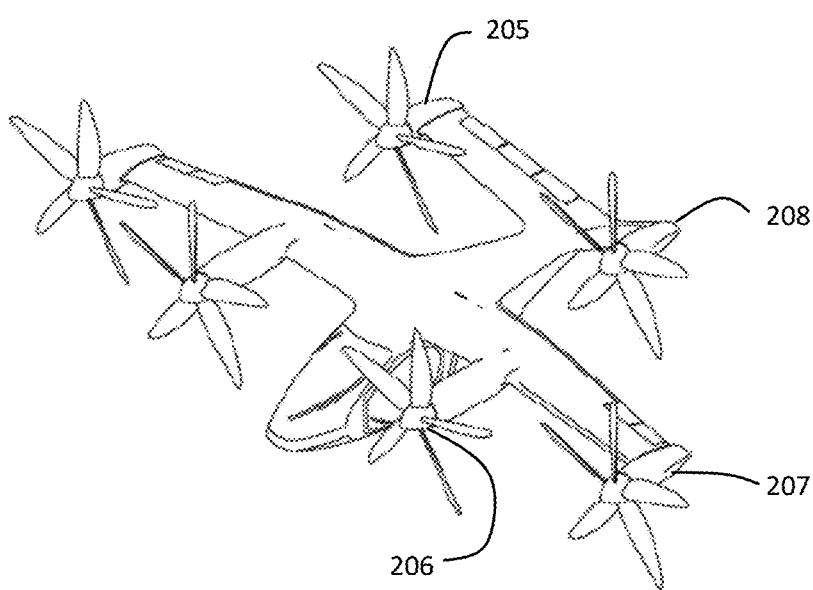
FIG. 2 illustrates an aircraft in a vertical flight configuration with compact rotary actuators according to some embodiments of the present invention.
Figure 3:
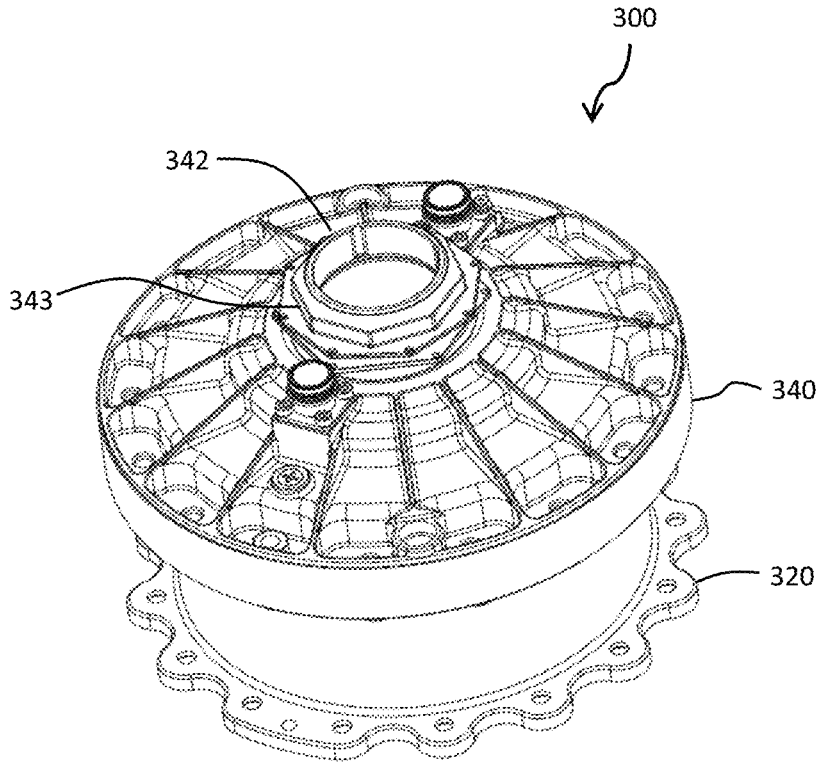
FIG. 3 is a raised view of a compact harmonic drive rotary actuator according to some embodiments of the present invention.
Figure 4:
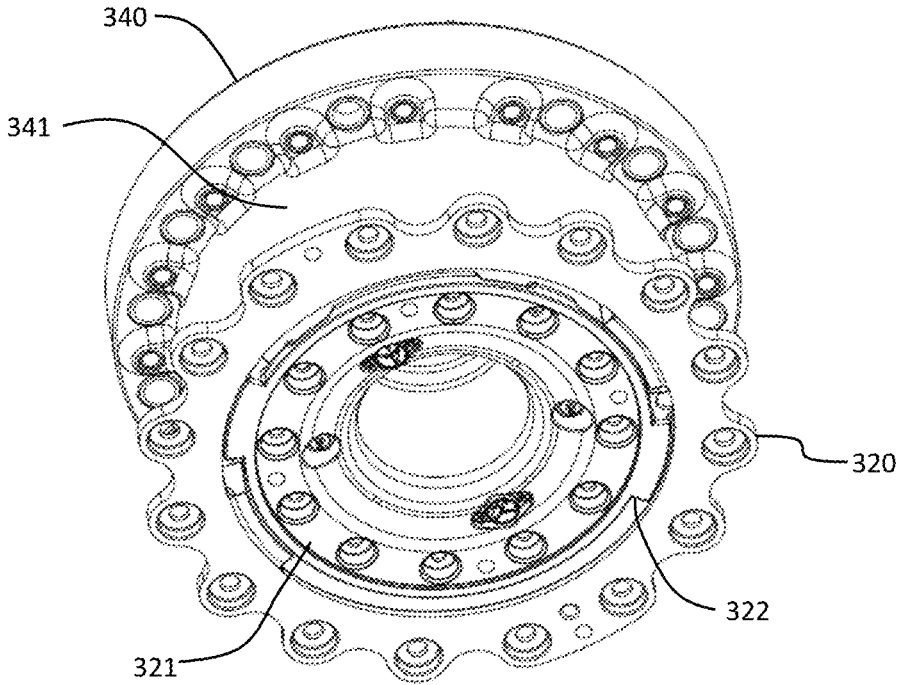
FIG. 4 is a lowered view of a compact harmonic drive rotary actuator according to some embodiments of the present invention.
Figure 5:
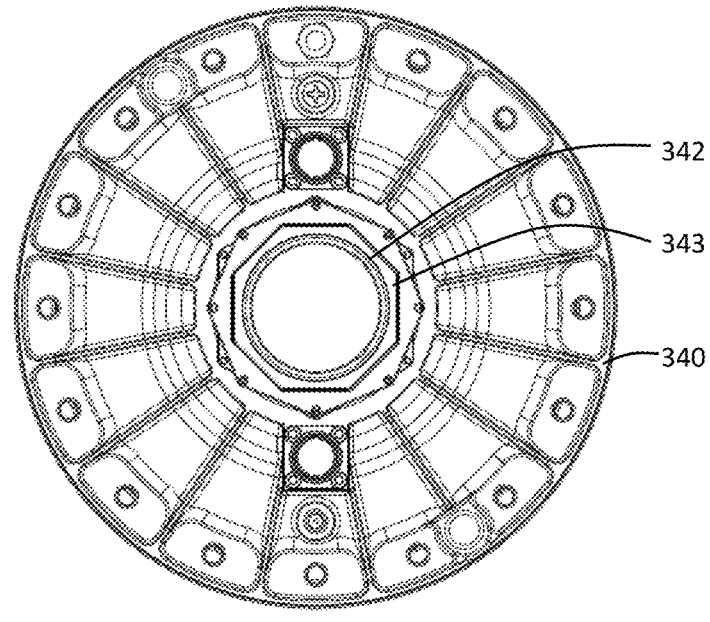
FIG. 5 is a top view of a compact harmonic drive rotary actuator according to some embodiments of the present invention.

The aerial vehicle 200 may have two rotors on the right wing 203 and two rotors on the left wing 202. The rotor assemblies mounted along the span of each wing may have wing mounted rotors 206 that are adapted to flip up into a deployed position for vertical take-off and landing, to be moved back towards a stowed position during transition to forward flight, and then to have their blades stowed, and nested, during forward flight. The outboard rotor assembly 207 may pivot, as discussed below. Similarly, each rear stabilizer 204 may be have a pivoting rotor unit 205, 208 mounted to it, which is adapted to be used during vertical take-off and landing, and transition, modes, as well as during forward flight. The forward flight configuration of the aerial vehicle 200 is shown in FIG. 2.

FIGS. 3-7 illustrate a compact harmonic drive rotary actuator 300 according to some embodiments of the present invention. The rotary actuator 300 is adapted to support a system wherein the actuator provides rotational support and rotational positioning, but where other loads are maintained separately by the system. The rotary actuator 300 has a fixed flange 321 which may be coupled to an aircraft structure, for example. A rotating body 340 is adapted to rotate relative to the fixed flange 321. The rotating body 340 may be coupled to an output body 341 which has an output flange 320. The circular output flange 320 which circumscribes the circular fixed flange allows for the actuation and rotational positioning control of a pair of concentric mating mounting brackets which are radially and longitudinally supported and constrained. In some aspects, one or more mechanical stops 322 on the fixed flange 321 may engage mating stops on the output flange 320 in order to limit rotational to a set range.

Figure 7:
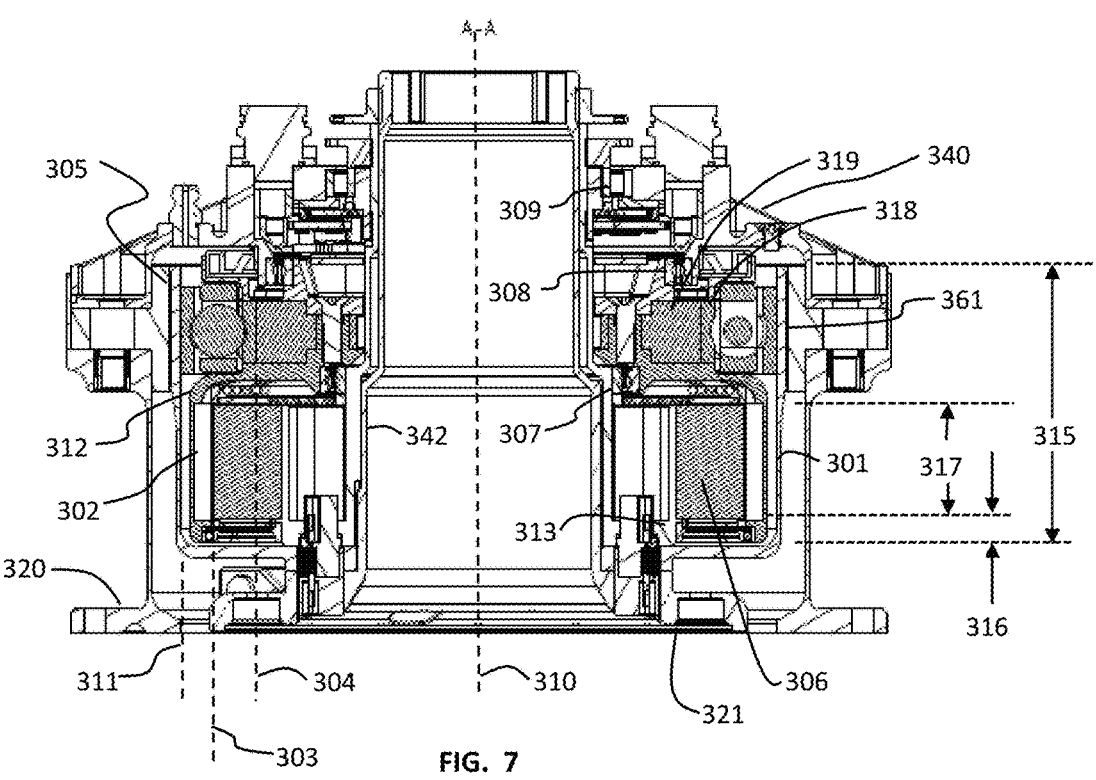
FIG. 7 is a cross-sectional view of a compact harmonic drive rotary actuator according to some embodiments of the present invention.

FIG. 7 illustrates a rotary actuator 300 in cross-section according to some embodiments of the present invention. The rotary actuator 300 presents advantages in that it provides very high torque due to the location of the motor rotor gap being at a large radial distance from the central axis 310, while also being extremely compact due to the location of the motor deep into the flexspline cup 301. In addition, the use of windings on the stator, which are able to be more efficiently thermally coupled to the main structure, allowing for better thermal management of the rotary actuator. The use of thin magnets on an external rotor allows for locating the rotor gap at a larger radial distance, which enhances torque output, while also reducing thermal load on the rotor relative to a wound rotor.

As seen in FIG. 7, the fixed flange 321 is fixedly coupled to the stator mount 313. The stator mount 313 supports the stator windings 306. This fixed set of structural components is also fixed to the flexspline cup 301. It should be understood that the initial designation of one flange 321 as fixed, and another flange as the output flange 320, is arbitrary and related to the in-use configuration and mounting. The fixed set of structural components have a central axis which is coincident with the actuator central axis 310. The stator mount 313 and the stator windings 306 are structurally and fixedly coupled to the internal shaft 342.

The motor rotor structure 312 supports the rotor magnets 302, which are adapted to rotate around stator windings 306. The motor air gap 303 resides at a significant radially outward distance from the central axis 310, and is at a distance that is a significant percentage of the flexspline cup outside diameter 311. In some aspects, the radial distance from the central axis to the air gap is >80% of the radial distance from the central axis to the flexspline cup outside diameter. In some aspects, the radial distance from the central axis to the air gap is >85% of the radial distance from the central axis to the flexspline cup outside diameter. In some aspects, the radial distance from the central axis to the air gap is >88% of the radial distance from the central axis to the flexspline cup outside diameter. With the increasing distance from the central axis, and the increased percentage of this distance relative to the flexspline cup outside diameter, higher torque is achieved with a smaller overall size of the rotary actuator.

As seen, the motor air gap 303 resides outboard of the interior side of the inner race 304 of the wave bearing 318. In addition, in some aspects, the stator windings 306 extend further radially outboard than the interior side of the inner race 304 of the wave bearing 318. In some aspects, the radial mid-point of the stator windings 306 is further radially outboard than the interior side of the inner race 304 of the wave bearing 318. Such a configuration allows for significant torque for a motor contained within the flexspline cup.

The motor also resides deep within the flexspline cup 301, further into the depth 315 of the flexspline cup 301 than the wave bearing 318 and the wave cam 319. The gap 316 between the stator windings 306 and the bottom of the flexspline cup 301 is also minimized in order to make the design compact. In an exemplary embodiment, the full depth 315 of the flexspline cup 301 is 67.2 mm, with the depth 317 of the windings 306 is 35.5 mm, and the winding come within 4.8 mm of the bottom of the flexspline cup 301. In some aspects, the ratio of the distance below the windings 316 to the axial length 317 of the windings 306 is less than 0.2. In some aspects, the ratio of the distance below the windings 316 to the axial length 317 of the windings 306 is less than 0.15. In some aspects, the ratio of the distance below the windings 316 to the axial length 317 of the windings 306 is less than 0.14. The combination of the outrunner motor configuration, using an external rotor comprising magnets of thin profile, and of the placement of the motor within the cup and below the wave generator bearing 318, and having the motor gap 303 further radially outboard than the interior side of the inner race 304 of the wave bearing 318, provides a rotary actuator with new properties and with a small volume vs. performance. In addition, the hollow interior within the interior surface of the central shaft 342 further allows for the passage of wiring, or other materials, through the rotary actuator 300.

Figure 6:
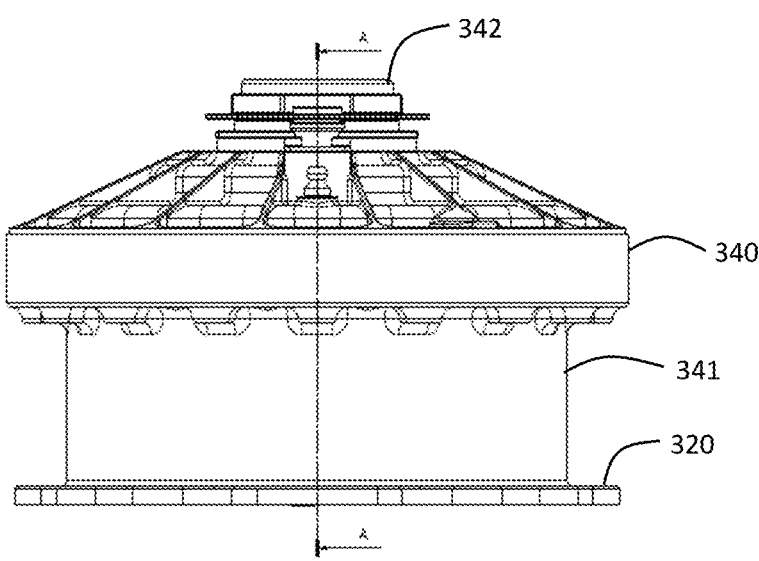
FIG. 6 is a side view of a compact harmonic drive rotary actuator according to some embodiments of the present invention.

The rotary actuator 300 is adapted to have three sections which rotate relative to each other. The first rotating section, coupled to the fixed flange 321, includes the motor stator and the flexspline cup. As the motor is stepped or otherwise driven, the external rotor structure 312 moves relative to the fixed flange, and drives the wave cam 319 in a rotary fashion. The rotor structure and the wave cam are parts of the second rotating section, which rotates around the stator as the motor is stepped. The third rotating section is coupled to the output flange 320. The output flange 320 is coupled to the output housing 341, which is coupled to the output housing cap 340, which are illustrated in FIG. 6. The output housing cap 340 is structurally coupled to the rigid circular spline 305. The rotating cam 319 results in engagement of the flexspline 361 with the internal gear teeth of the rigid circular spline 305. The differential engagement of the flexspline 361 with the circular spline 305 results in the rotation of the third section, which is coupled to the output flange 320. The internal shaft 342 couples the fixed flange across the inside of the actuator and is fastened with a nut 343.

In contrast to a typical motor wherein the motor rotor is coupled to the motor stator by a bearing pair at each end of a motor shaft, in aspects of the present invention a three bearing system may be used. A first bearing 307 resides between the stator structure 313 and the motor rotor structure 312. The motor rotor is then secondarily supported by a bearing 308 between the motor rotor structure and output structure. A third bearing 309 the couples the output structure back to the fixed structure. These three coaxial bearings thus perform the function of what was previously supported by two sets of two bearings, or more. In some aspects, the first rotating section is rotationally coupled to the second rotating section with just a single bearing. In some aspects, the second rotating section is rotationally coupled to the third rotating section with just a single bearing. In some aspects, the third rotating section is rotationally coupled to the first rotating section with just a single bearing. This unorthodox bearing scheme further contributes to the compact nature of the rotary actuator 300.

The bearing scheme of the rotary actuator 300 as described above may have limitations in that although the rotary actuator may be fully functional in supporting loads around the rotation of the actuator central axis 310, it may have reduced moment carrying capacity in moment directions in the perpendicular axes. The rotary actuator 300 is adapted to be part of a deployment system wherein there are other structural components which are rotationally coupled to each other, and also coupled to the input and output flanges of the rotary actuator, but further support all of the perpendicular moment loads, and the axial loads, which would have otherwise been supported by the rotary actuator.

Figure 9:
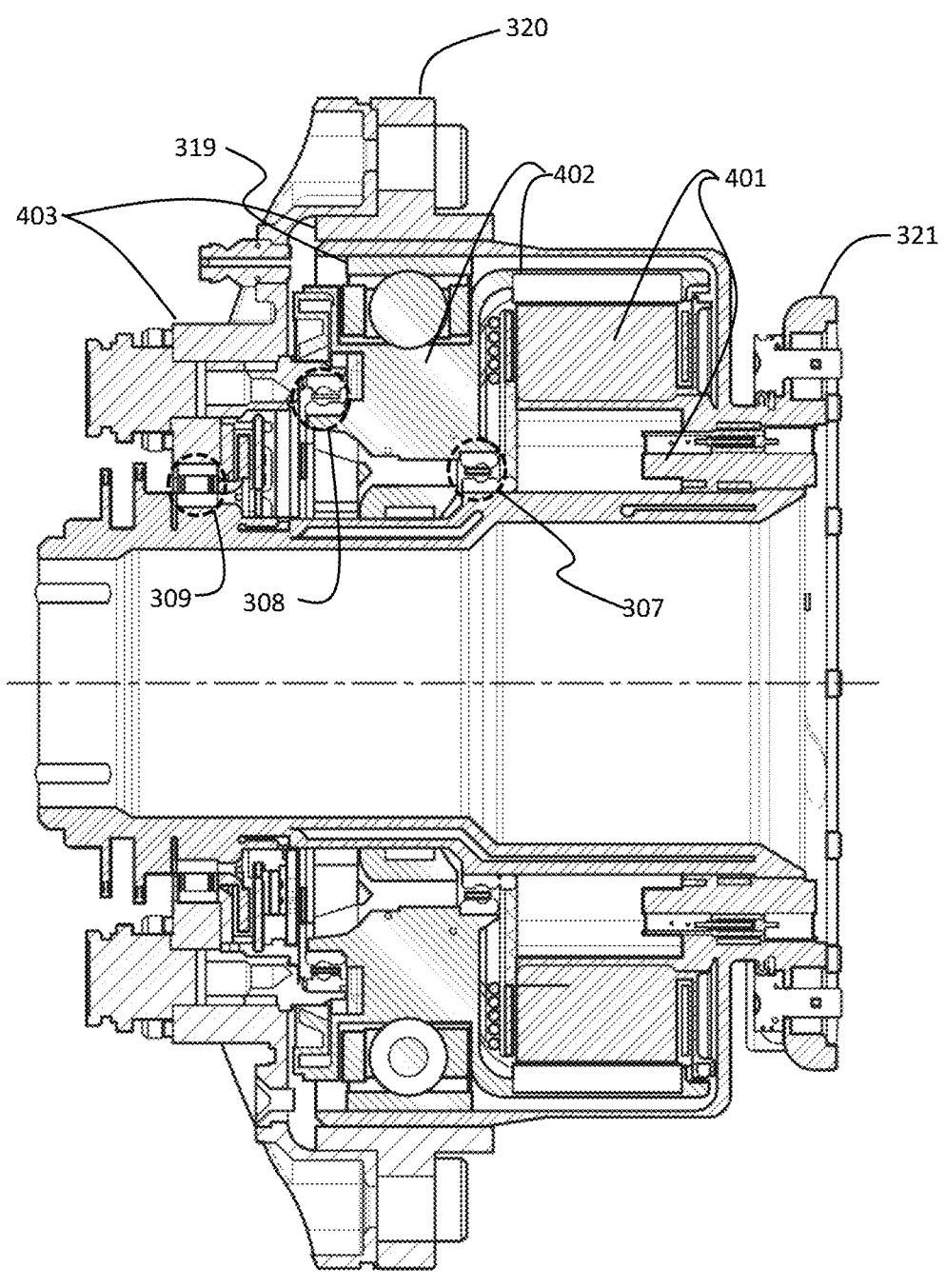
FIG. 9 is a cross-sectional view of a compact harmonic drive rotary actuator according to some embodiments of the present invention.

FIG. 9 illustrates in cross-section the first, second, and third rotating sections, using different cross-sectional line types to represent the different rotating section, and the bearings between them. The first rotating section 401, coupled to the fixed flange 321, includes the motor stator and the flexspline cup. Although referred to as the first rotating section, this section may also be viewed as fixed, with everything rotating relative to it. As the motor is stepped or otherwise driven, the external rotor structure 312 moves relative to the fixed flange, and drives the wave cam 319 in a rotary fashion. The rotor structure and the wave cam are parts of the second rotating section 402, which rotates around the stator as the motor is stepped. The third rotating section 403 is coupled to the output flange 320.

Figure 8:
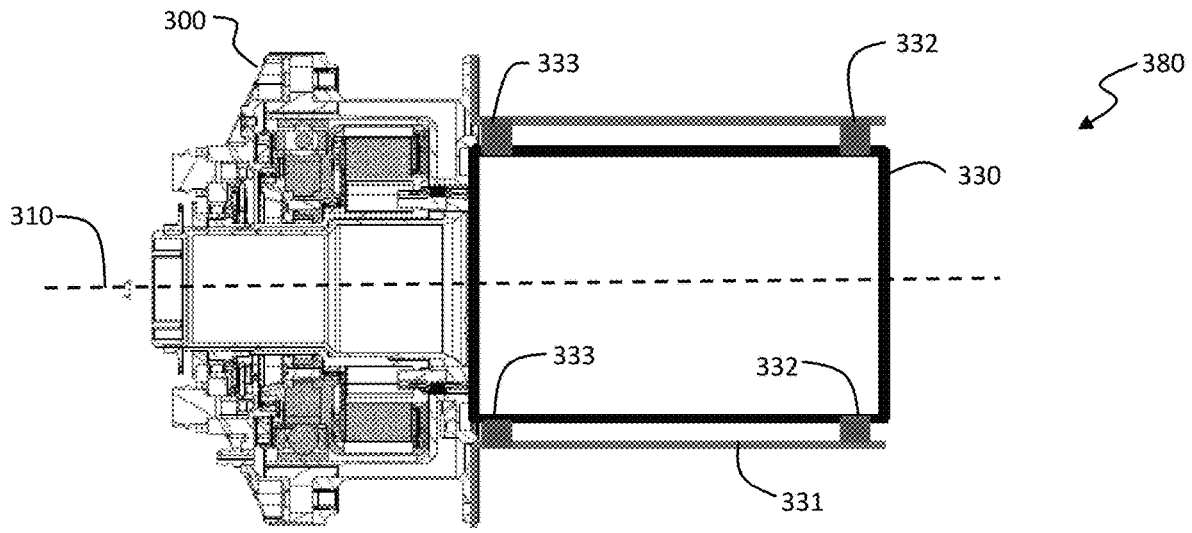
FIG. 8 is a side view of a compact harmonic drive rotary actuator with supporting structure according to some embodiments of the present invention.

FIG. 8 illustrates a deployment system 380 in which the compact harmonic drive rotary actuator 300 may be incorporated. A fixed inner structure 330 may be coupled to an aircraft structure, for example. The fixed inner structure 330 is coupled to the fixed flange 321. The fixed inner structure 330 is rotationally coupled to a rotating bracket 331 using an inboard bearing 332 and an outboard bearing 333. The rotating bracket 331 is coupled to the output flange 320 of the compact harmonic drive rotary actuator 300. In this exemplary embodiment, the radial and axial loads of the system are supported by the inboard bearing 332 and the outboard bearing 333, while the radial positioning and the holding of radial position are performed by the inboard bearing 332 and an outboard bearing 333 harmonic drive rotary actuator 300.

Figure 10:
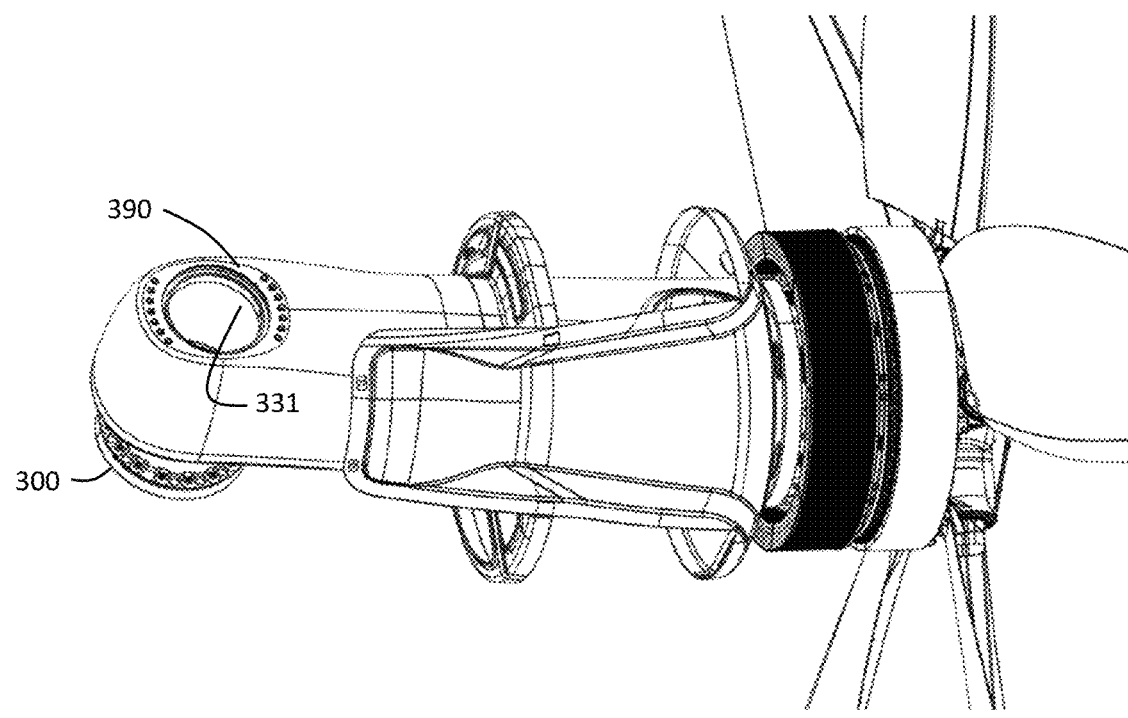
FIG. 10 is a view of a compact harmonic drive rotary actuator as part of a rotor deployment system according to some embodiments of the present invention.

In some embodiments of the present invention, as seen in FIG. 10, the deployment system 380 is used to deploy a wingtip rotor 207, which has been shown in FIGS. 1 and 2. The external nacelle shell has been omitted for clarity, as have portions of the rotary actuator. The rotating bracket 331 is coupled to the support structure of the deployable motor driven rotor assembly and is adapted to rotate around a fixed inner structure 330 (not shown) which extends from the wing structure at the wing tip. In some aspects, the rotary actuator 300 is on the outboard side, in that it is further outboard from the aircraft body than the inboard side of the support structure of the deployable motor driven rotor assembly.

Figure 11:
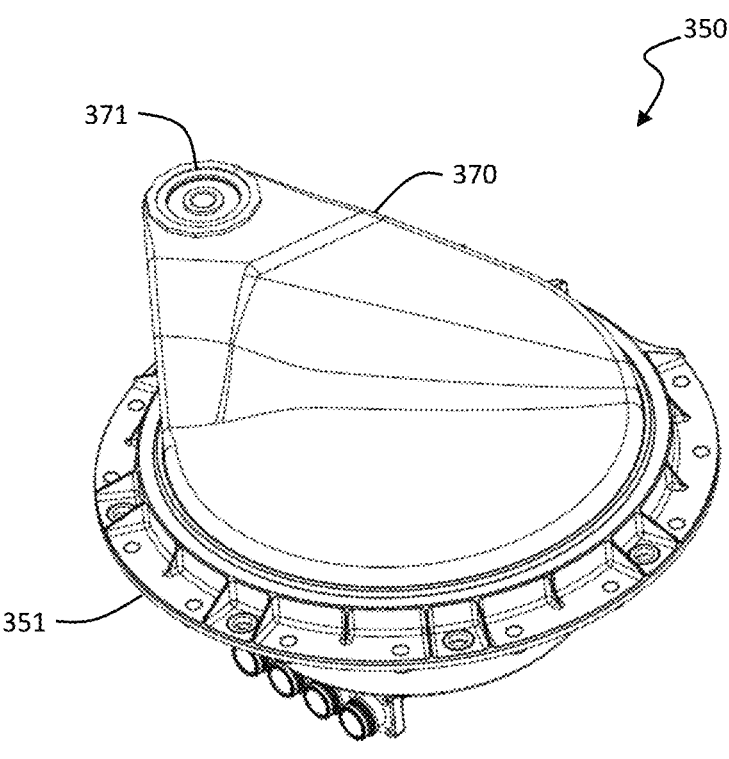
FIG. 11 is a raised view of a compact harmonic drive rotary actuator according to some embodiments of the present invention.
Figure 12:
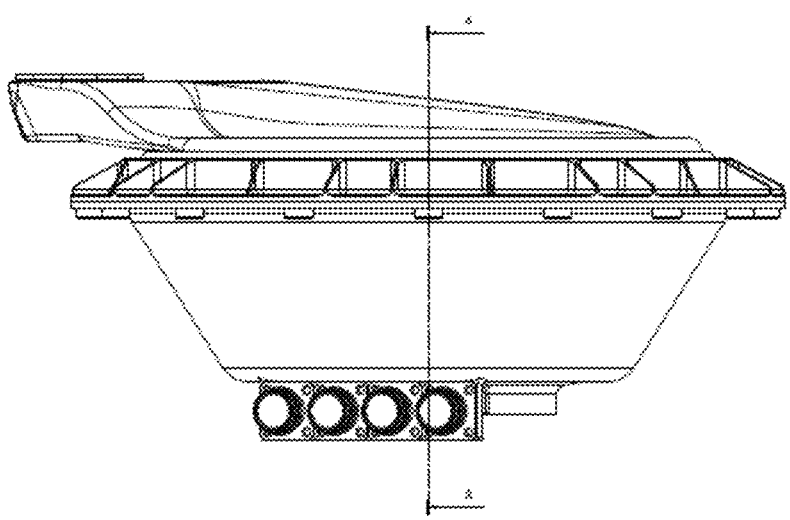
FIG. 12 is a side view of a compact harmonic drive rotary actuator according to some embodiments of the present invention.
Figure 13:
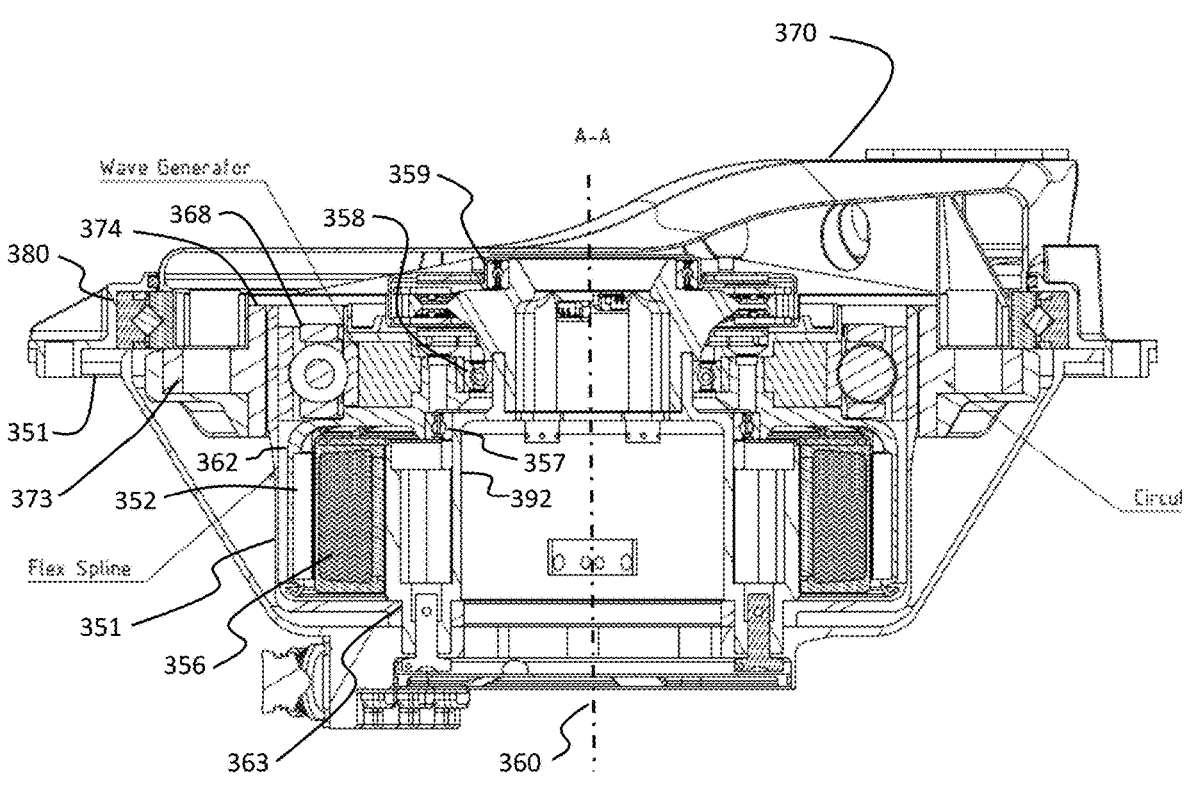
FIG. 13 is a cross-sectional view of a compact harmonic drive rotary actuator according to some embodiments of the present invention.

FIGS. 11-13 illustrate another compact harmonic drive 350 according to some embodiments of the present invention. A fixed flange 351 is fixedly coupled to the stator mount 363. The stator mount 363 supports the stator windings 356. This fixed set of structural components is also fixed to the flexspline cup 351. The fixed set of structural components have a central axis which is coincident with the actuator central axis 360. The stator mount 363 and the stator windings 356 are structurally and fixedly coupled to the internal shaft 392.

The motor rotor structure 362 supports the rotor magnets 352, which are adapted to rotate around stator windings 356. The motor air gap resides at a significant radially outward distance from the central axis 360, and is at a distance that is a significant percentage of the flexspline cup outside diameter. In some aspects, the radial distance from the central axis to the air gap is >80% of the radial distance from the central axis to the flexspline cup outside diameter. In some aspects, the radial distance from the central axis to the air gap is >85% of the radial distance from the central axis to the flexspline cup outside diameter. In some aspects, the radial distance from the central axis to the air gap is >88% of the radial distance from the central axis to the flexspline cup outside diameter. With the increasing distance from the central axis, and the increased percentage of this distance relative to the flexspline cup outside diameter, higher torque is achieved with a smaller overall size of the rotary actuator.

As seen, the motor air gap resides outboard of the interior side of the inner race of the wave bearing. In addition, in some aspects, the stator windings 306 extend further radially outboard than the interior side of the inner race 304 of the wave bearing 368. In some aspects, the radial mid-point of the stator windings is further radially outboard than the interior side of the inner race of the wave bearing 368. Such a configuration allows for significant torque for a motor contained within the flexspline cup.

The motor also resides deep within the flexspline cup 351, further into the depth of the flexspline cup 351 than the wave bearing 368 and the wave cam. The gap between the stator windings 356 and the bottom of the flexspline cup 351 is also minimized in order to make the design compact. In some aspects, the ratio of the distance below the windings to the axial length of the windings 356 is less than 0.2. In some aspects, the ratio of the distance below the windings 356 to the axial length 317 of the windings 356 is less than 0.15. In some aspects, the ratio of the distance below the windings 356 to the axial length of the windings 356 is less than 0.14. The combination of the outrunner motor configuration, using an external rotor comprising magnets of thin profile, and of the placement of the motor within the cup and below the wave generator bearing, and having the motor gap further radially outboard than the interior side of the inner race of the wave bearing, provides a rotary actuator with new properties and with a small volume vs. performance.

The rotary actuator 350 is adapted to have three sections which rotate relative to each other. The first rotating section, coupled to the fixed flange 351, includes the motor stator and the flexspline cup. As the motor is stepped or otherwise driven, the external rotor structure 362 moves relative to the fixed flange, and drives the wave cam in a rotary fashion. The rotor structure and the wave cam are parts of the second rotating section, which rotates around the stator as the motor is stepped. The third rotating section is coupled to the output flange 370. The output flange 370 is coupled to the output housing 373. The output housing is structurally coupled to the rigid circular spline 374. The rotating cam results in engagement of the flexspline with the internal gear teeth of the rigid circular spline. The differential engagement of the flexspline with the circular spline results in the rotation of the third section, which is coupled to the output flange 370. The internal shaft couples the fixed flange across the inside of the actuator.

In contrast to a typical motor wherein the motor rotor is coupled to the motor stator by a bearing pair at each end of a motor shaft, in aspects of the present invention a three bearing system may be used. A first bearing 357 resides between the stator structure 363 and the motor rotor structure 362. The motor rotor is then secondarily supported by a bearing 358 between the motor rotor structure and output structure. A third bearing 359 the couples the output structure back to the fixed structure. These three coaxial bearings thus perform the function of what was previously supported by two sets of two bearings, or more. In some aspects, the first rotating section is rotationally coupled to the second rotating section with just a single bearing. In some aspects, the second rotating section is rotationally coupled to the third rotating section with just a single bearing. In some aspects, the third rotating section is rotationally coupled to the first rotating section with just a single bearing. This unorthodox bearing scheme further contributes to the compact nature of the rotary actuator 350.

The bearing scheme of the rotary actuator 350 as described above may have limitations in that although the rotary actuator may be fully functional in supporting loads around the rotation of the actuator central axis 360, it may have reduced moment carrying capacity in moment directions in the perpendicular axes. The rotary actuator 350 may include a support bearing 380 adapted to provide axial and radial support, and also support moment loading. The support bearing 380 may be cross-axis roller bearing.

Figure 15:
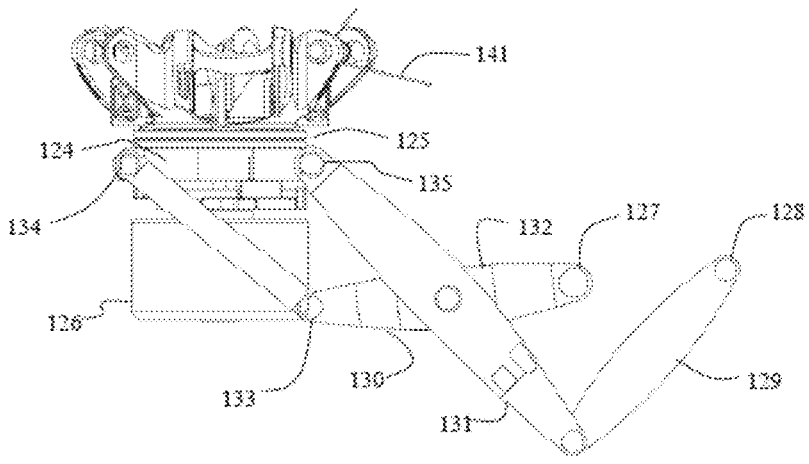
FIG. 15 is a side view of a deployment mechanism.

FIG. 15 is a side view of portions of a rotor deployment mechanism of a deployable motor driven rotor assembly according to some embodiments of the present invention. The main mounting points 127, 128 are the structural attachment points for the rotor deployment mechanism, and by extension, for the motor driven rotor unit, to the aerial vehicle. The drive motor 126 is adapted to drive the rotor main hub, and by extension, the propeller of the rotor unit.

Figure 14:
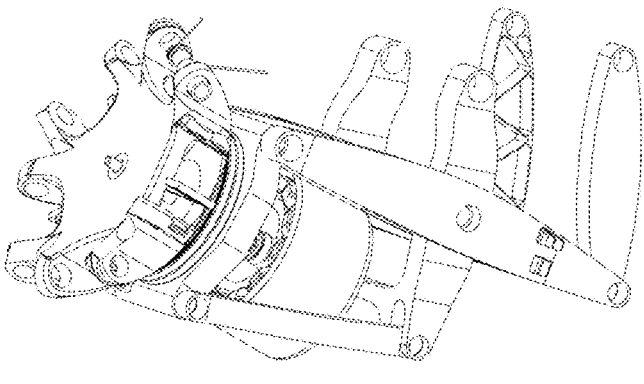
FIG. 14 is a perspective view of a deployment mechanism.
Figure 16:
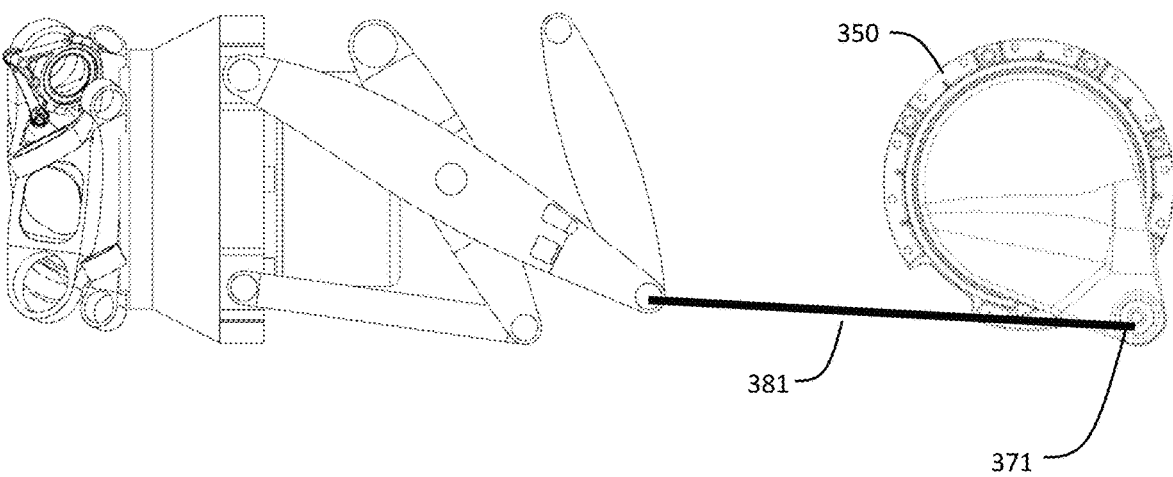
FIG. 16 is a side view of a compact harmonic drive rotary actuator with a deployment mechanism in a stowed configuration according to some embodiments of the present invention.

FIG. 14 illustrates a rotor deployment mechanism in a partially deployed position. The rotor deployment mechanism may be driven from a stowed configuration to a deployed configuration with a compact harmonic drive assembly 350. FIG. 16 illustrates the rotor deployment mechanism in a deployed, vertical take-off, configuration. The rotor deployment mechanism has both rotated and displaced the rotor. The deployment has pushed the rotor hub forward, and away, from the main mounting points 127, 128, as well as upward vertically relative to the main mounting points. In this vertical take-off configuration, the rotor axis is vertical. In some aspects, with the use of rotor deployment mechanisms as described herein, the nacelle may be seen as being split during the rotor deployment such that the rear portion of the nacelle stays with the wing in a fixed positional relationship. The rotor deployment may then be able to occur from a nacelle along the wing, or along a rear horizontal stabilizer element. In some aspects, the motor and propeller may deploy out from the nacelle. The rotor deployment mechanisms may be mounted at a position that is not the end of the wing, or other horizontal element.

The outboard bracket 124 is attached to the deployment linkages at the bracket attach points 134, 135. The bracket arms 129, 130, 131 link via pivot points 132, 133. With the use of multi-arm linkages, the rotor may be moved to preferred positions in both the deployed and stowed configurations. FIG. 15 illustrates the deployment mechanism with its linkages in a partially deployed configuration, which is seen during transitions from vertical to horizontal thrusting, or from horizontal to vertical thrusting.

The electric motor/propeller combination being on the outboard side of the articulating joint allows for a rigid mounting of the propeller to the motor, which is maintained even as the propeller is moved through various attitudes relative to the rear nacelle portion. With such a configuration the rotating power from the motor need not be gimbaled or otherwise transferred across a rotating joint.

FIG. 16 illustrates a deployment drive system for a deployment mechanism according to some embodiments of the present invention. A rotary actuator 350 may be coupled to the aerial vehicle, within the wing in an area adjacent to the mounting points for the main mounting points 127, 128. The harmonic drive assembly 350 may be coupled to a first pivot location 383 of the linkage assembly by a drive rod 381 coupled to the output interface 371 of the harmonic drive assembly 350 such that the deployment linkage is driven from a stowed configuration to a deployed configuration, and from a deployed configuration to a stowed configuration.

Figure 17:
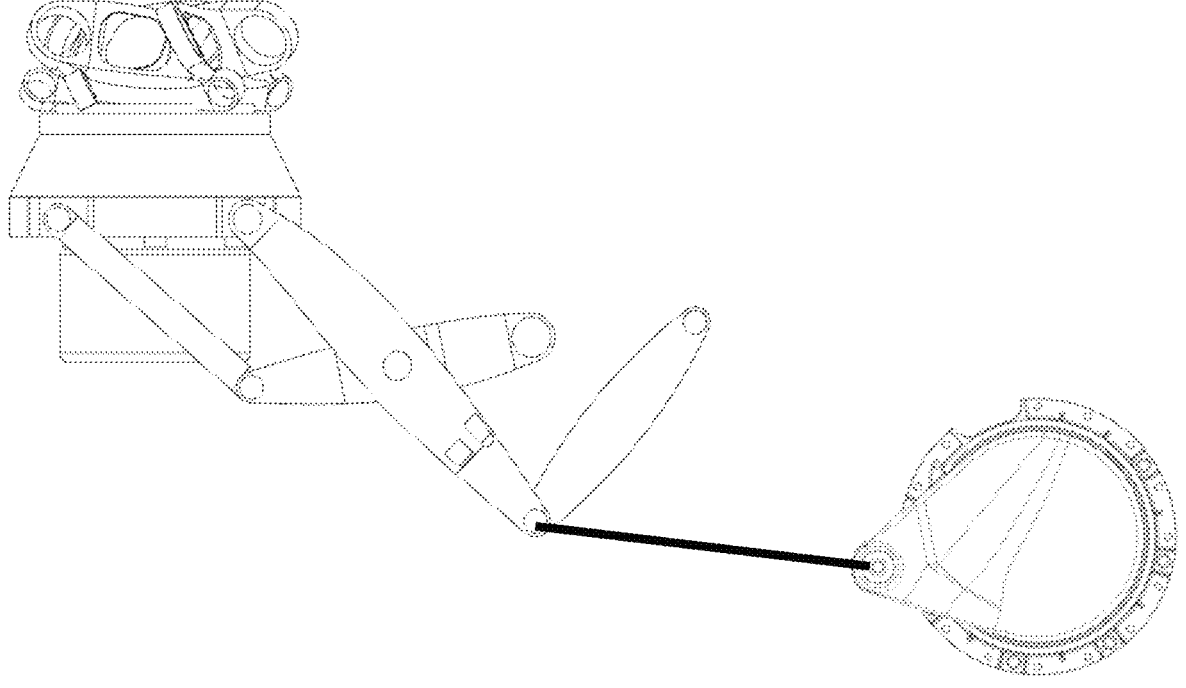
FIG. 17 is a side view of a compact harmonic drive rotary actuator with a deployment mechanism in a deployed configuration according to some embodiments of the present invention.

FIG. 16 illustrates the rotor deployment mechanism in a stowed position, as would be used in forward flight, and as illustrated in FIG. 2. FIG. 17 illustrates the rotor deployment mechanism in a deployed position, as would be used during vertical take-off and landing, an as illustrated in FIG. 1.

As evident from the above description, a wide variety of embodiments may be configured from the description given herein and additional advantages and modifications will readily occur to those skilled in the art. The invention in its broader aspects is, therefore, not limited to the specific details and illustrative examples shown and described. Accordingly, departures from such details may be made without departing from the spirit or scope of the applicant's general invention.

What is claimed is:

1. A compact harmonic drive rotary actuator system, said harmonic drive rotary actuator system comprising:
   a rotary actuator, said rotary actuator comprising:
      a first flange;
      a second output flange rotationally coupled to said first flange around a first axis;
      a drive motor, said drive motor comprising:
         a stator fixedly coupled to said first flange; and
         an external rotor, said external rotor rotationally coupled to said stator, said external rotor rotationally coupled to said second output flange;
      a wave generator fixedly coupled to said external rotor of said motor, said wave generator comprising:
         a wave generator cam; and
         a wave bearing having an internal surface mounted to an external surface of said wave generator cam;
      a flexspline cup, said flexspline cup fixedly coupled to said first flange; and
      a circular internal spline, said circular internal spline fixedly coupled to said second output flange, wherein said second output flange is rotationally coupled to said first flange with just a single first bearing, and wherein said external rotor is rotationally coupled to said stator with just a single second bearing, and wherein said external rotor is rotationally coupled to said second output flange with just a single third bearing; and
   a deployment system support structure, said deployment system support structure comprising:
      an inner structure coupled to said first flange; and
      an outer structure coupled to said second flange,
   wherein said inner structure and said outer structure are rotationally coupled with a first support structure bearing and a second support structure bearing, and wherein said first support structure bearing and said second support structure bearing are displaced along said first axis.

2. The compact harmonic drive rotary actuator assembly system of claim 1 wherein said inner structure is structurally coupled to an aircraft wingtip.

3. The compact harmonic drive rotary actuator assembly system of claim 2 wherein said rotary actuator further comprises a through hole through the entirety of said rotary actuator along said first axis.

4. The compact harmonic drive rotary actuator assembly system of claim 1 wherein said rotary actuator further comprises a through hole through the entirety of said rotary actuator along said first axis.

* * * * *